United States Patent
Cannon, Jr.

(10) Patent No.: US 10,266,291 B1
(45) Date of Patent: Apr. 23, 2019

(54) METHOD AND APPARATUS FOR VACUUM PACKING FOOD CONTAINERS

(71) Applicant: Thomas Calvin Cannon, Jr., Las Vegas, NV (US)

(72) Inventor: Thomas Calvin Cannon, Jr., Las Vegas, NV (US)

( * ) Notice: Subject to any disclaimer, the term of this patent is extended or adjusted under 35 U.S.C. 154(b) by 0 days.

(21) Appl. No.: 15/789,969

(22) Filed: Oct. 21, 2017

(51) Int. Cl.
| | |
|---|---|
| *B65B 31/00* | (2006.01) |
| *B65B 7/28* | (2006.01) |
| *B65B 31/04* | (2006.01) |
| *B65B 31/02* | (2006.01) |
| *B65D 43/02* | (2006.01) |
| *B65D 81/20* | (2006.01) |

(52) U.S. Cl.
CPC ............ *B65B 31/00* (2013.01); *B65B 7/2842* (2013.01); *B65B 31/02* (2013.01); *B65B 31/047* (2013.01); *B65D 43/02* (2013.01); *B65D 81/2015* (2013.01); *B65D 81/2038* (2013.01); *B65D 2251/08* (2013.01); *B65D 2543/00231* (2013.01); *B65D 2543/00416* (2013.01); *B65D 2543/00564* (2013.01)

(58) Field of Classification Search
CPC ............... B65B 31/00; B65B 31/047; B65B 2543/00416; B65B 2543/00231; B65B 2543/0049; B65B 2543/00435; B65B 7/28; B65B 7/2842; B65D 81/2038; B65D 39/02; B65D 39/14; B65D 39/12; B65D 39/04; B65D 43/022; B65D 43/327; B65D 81/2015; B65D 39/0052; B65D 2251/08

USPC ...... 53/510, 432; 99/472; 220/200–238, 287
See application file for complete search history.

(56) References Cited

U.S. PATENT DOCUMENTS

| | | | | |
|---|---|---|---|---|
| 533,876 | A * | 2/1895 | Ernst ..................... | B65D 41/22 220/287 |
| 1,317,045 | A * | 9/1919 | Shawley ............ | B65D 47/0847 220/254.2 |
| 2,416,900 | A * | 3/1947 | Busby ................. | B65D 51/1683 215/307 |
| 3,083,861 | A * | 4/1963 | Amberg ............. | B65D 43/0208 220/371 |
| 3,430,777 | A * | 3/1969 | Esposito, Jr. .......... | B65D 39/00 215/256 |
| 3,653,581 | A * | 4/1972 | Ptak ................... | B65D 43/0208 206/497 |
| 3,994,749 | A * | 11/1976 | Decker ............... | H01M 2/1229 429/53 |
| 4,051,971 | A * | 10/1977 | Saleri ................. | B65D 51/1683 215/228 |
| 4,182,461 | A * | 1/1980 | Waldau ................. | B65D 15/08 215/279 |
| 4,198,040 | A * | 4/1980 | Colasent ................ | A47J 36/06 220/254.4 |

(Continued)

*Primary Examiner* — Alexander M Valvis
*Assistant Examiner* — Eduardo R Ferrero

(57) ABSTRACT

A method and apparatus for reliably vacuum packing any size bottle, jars or bowl. The method being to stack progressively larger overlapping vacuum lids atop one another to fit size opening of a food storage container. The apparatus consisting of an assembly of overlapping circular vacuum lids wherein the bottom surface of each circular vacuum lid is covered with a flexible elastomeric gasket that can form an air-tight seal with either a mating overlapping circular vacuum lid or the opening of a food storage container.

2 Claims, 3 Drawing Sheets

(56) References Cited

U.S. PATENT DOCUMENTS

| | | | | |
|---|---|---|---|---|
| 4,215,797 A * | 8/1980 | Chen | B65D 43/022 | 220/276 |
| 4,278,114 A * | 7/1981 | Ruberg | A23L 3/0155 | 137/565.25 |
| 4,512,493 A * | 4/1985 | Von Holdt | B65D 21/0219 | 206/505 |
| 4,552,288 A * | 11/1985 | Flider | B65D 51/165 | 220/203.17 |
| 4,574,974 A * | 3/1986 | von Holdt | B65D 1/46 | 220/782 |
| 4,718,571 A * | 1/1988 | Bordner | B65D 21/022 | 206/508 |
| 5,065,885 A * | 11/1991 | Scaroni | B65D 45/22 | 220/326 |
| 5,103,993 A * | 4/1992 | Bingisser | B65D 43/0256 | 220/782 |
| 5,121,590 A * | 6/1992 | Scanlan | B65B 31/047 | 137/533.21 |
| 5,195,427 A * | 3/1993 | Germano | B65B 31/047 | 141/65 |
| 5,245,507 A * | 9/1993 | Ericksen | H02B 1/28 | 174/67 |
| 5,347,918 A * | 9/1994 | Chen | A47J 27/002 | 220/231 |
| 5,364,241 A * | 11/1994 | Schultz | B65B 31/047 | 215/260 |
| 5,390,809 A * | 2/1995 | Lin | B65B 31/047 | 137/522 |
| 5,617,705 A * | 4/1997 | Sanfilippo | B65B 31/00 | 53/281 |
| 5,938,062 A * | 8/1999 | Paramski | B65D 17/506 | 220/222 |
| 5,992,666 A * | 11/1999 | Wu | B65B 31/047 | 215/228 |
| 6,044,756 A * | 4/2000 | Chang | B65B 31/047 | 220/212 |
| 6,364,152 B1 * | 4/2002 | Poslinski | A47J 36/10 | 215/270 |
| 6,408,872 B1 * | 6/2002 | Skeens | B65D 33/1666 | 137/512.15 |
| 6,789,690 B2 * | 9/2004 | Nieh | B65D 81/2015 | 215/228 |
| 6,994,227 B2 * | 2/2006 | Kwon | A47J 47/10 | 116/309 |
| 7,798,319 B1 * | 9/2010 | Bried | A24F 23/00 | 131/352 |
| 9,725,224 B2 * | 8/2017 | Han | B65D 53/02 | |
| 2002/0134782 A1 * | 9/2002 | Heil | B65D 81/2038 | 220/212 |
| 2003/0234253 A1 * | 12/2003 | Helms, Jr. | B65D 39/12 | 220/234 |
| 2006/0032852 A1 * | 2/2006 | Cai | B65D 51/1683 | 220/287 |
| 2006/0231556 A1 * | 10/2006 | Wei | B65B 31/047 | 220/203.18 |
| 2007/0175896 A1 * | 8/2007 | Bursztein | B65D 43/0218 | 220/231 |
| 2008/0041852 A1 * | 2/2008 | Cai | B65D 81/2038 | 220/231 |
| 2008/0041869 A1 * | 2/2008 | Backaert | B65D 39/025 | 220/804 |
| 2008/0217335 A1 * | 9/2008 | Chen | B65D 51/1683 | 220/231 |
| 2008/0223222 A1 * | 9/2008 | Palamara | A47J 27/09 | 99/337 |
| 2010/0263328 A1 * | 10/2010 | Dorsey | B65D 43/0218 | 53/432 |
| 2010/0326987 A1 * | 12/2010 | Ferlito | B65B 31/047 | 220/231 |
| 2012/0138605 A1 * | 6/2012 | Grundy | B62B 5/0083 | 220/4.01 |
| 2012/0199582 A1 * | 8/2012 | Cai | B65D 21/0209 | 220/203.04 |
| 2013/0068650 A1 * | 3/2013 | Tinstman | B65B 31/04 | 206/459.1 |
| 2015/0108080 A1 * | 4/2015 | Grittmann | B65D 39/12 | 215/359 |
| 2016/0054049 A1 * | 2/2016 | Harvie | B65D 81/2015 | 426/383 |
| 2017/0036831 A1 * | 2/2017 | Gordon | G07C 9/00142 | |
| 2017/0050775 A1 * | 2/2017 | Sanbar | B65D 47/06 | |
| 2018/0009589 A1 * | 1/2018 | Ho | B65D 81/2038 | |

\* cited by examiner

METHOD AND APPARATUS FOR VACUUM PACKING FOOD CONTAINERS

This invention relates to vacuum packing food containers. More specifically, this invention relates to vacuum packing food containers commonly used to preserve fresh foods and leftover foods in home refrigerators. Such containers include bottles, jars, bowls, pots, and pie pans, for example. Vacuum packing such containers requires special apparatus capable of making air-tight seals on container openings ranging from as small as ½ inch to over 10 inches in diameter. This can be achieved with an assembly of circular vacuum lids having overlapped inner and outer diameters. The overlapping circular lids may be concentrically stacked atop one another to extend the outer diameter of the vacuum lid assembly to cover the opening of any size food storage container. Further, the individual circular vacuum lids can be reinforced by circular ribs that prevent excessive deformation of the composite lid structure when food containers are placed under vacuum.

BACKGROUND OF THE INVENTION

Many people choose not to vacuum pack their fresh foods and leftovers because it is much more convenient to simply snap a cover onto the top of a low-cost plastic container and place the container in the refrigerator (provided, of course, a cover that matches the container can be found). Although covering a container helps retain moisture, it does not stop food from oxidizing and losing its fresh taste. The only way to prevent oxidation is to vacuum pack food. Most households have an ample supply of low-cost polyethylene (PE) food containers of various shapes and sizes. However, PE containers can't hold a vacuum because polyethylene continually deforms when placed under load—a phenomenon known as "creep". Creep can cause any vacuum seal to quickly leak. Accordingly, simply vacuum packing food in low-cost PE consumers is not viable.

However, most households also possess sturdy food containers that can, in fact, hold a vacuum. Such containers are made of either metal, glass, ceramic, glass-ceramic formulations, clay, or stiff plastics such as polycarbonate (PC), ABS, acrylic, and thermoset materials. Accordingly, most households have the option of vacuum packing their food by either placing their food directly in such sturdy containers, or using an indirect approach of placing PE food containers inside more sturdy containers before performing the vacuum packing operation.

People who decide to vacuum pack their foods do so to extract the most value from their purchases. As such, to realize a net savings, the amortized cost of vacuum packing apparatus must be less than the cost of the food that users are trying to preserve. However, because it is very challenging to achieve reliable air-tight seals between un-matched food containers and lids, most vendors sell food containers and vacuum lids only as matched pairs, with a flexible elastomeric gasket affixed to the vacuum lids to create air-tight seals between the two parts. This practice increases the cost of vacuum packing apparatus, thereby reducing the net savings. This practice also increases the space that vacuum packing apparatus takes up in crowded kitchen cabinets and drawers. Further, any theoretical net savings must outweigh the inconvenience and time it takes to perform the vacuum packing operation. Accordingly, vacuum packing systems for home food containers must be usable without employing elaborate ancillary equipment (such as special-purpose vacuum packing machines) that take a significant amount of time to set up and operate. Also, the vacuum packing apparatus should be sufficiently compact to conveniently fit in crowded kitchens. Finally, vacuum packing systems must be reliable and consistently retain vacuums for extended periods.

As previously stated, traditional apparatus for vacuum packing food containers employ gaskets that only fit specific containers. For example, Mason jar lids employ narrow, circular, flexible elastomeric gaskets that are bonded to the lids' outer perimeter. Consequently, a lid that fits a Wide Mouth Mason jar will not fit a Regular-Size Mason jar, and vice versa. Although the narrow width of the flexible elastomeric gasket of Wide Mouth lids could be increased to cover the mouth of Regular-size Mason jars, doing so would significantly increase the lids' cost. Finally, Mason jar lids are secured to Mason jars by means of threaded metal collars whose threads match those of the Mason jar. Hence a Wide Mouth Mason Jar lid of any type cannot be secured to Regular size Mason jar by customary means. Accordingly, until now, flexible elastomeric gaskets have been designed to only fit the mouths of specific food storage containers, and not the mouths of a wide range of food containers.

Consumers like rectangularly-shaped food containers because they (1) accommodate rectangularly-shaped food items (such as sandwiches), and (2) efficiently fit inside rectangularly-shaped refrigerators. However, re-enterable circular-shaped food containers can remain air-tight more reliably than re-enterable rectangularly-shaped food containers. This is because the free edges (i.e. the edges around openings) of food storage containers deform under a vacuum, thereby creating unequal sealing pressure along the free edges of asymmetric containers. Leaks occur at low pressure points along a food container's flexible elastomeric gasket. This unfavorable characteristic of rectangularly-shaped seals (i.e. "seal" defined as the interface between two mating parts) is why the old Bell System (AT&T) only employed circular gaskets on its water-proof metal cases that enclosed spliced communications cables. Such splice cases remained air-tight and waterproof in the uncontrolled outdoor environment for 40 or more years over temperatures ranging from 115 degrees to minus 40 degrees Fahrenheit. Accordingly, it is desirable for a versatile vacuum lid structure (i.e., a vacuum lid structure capable of fitting a variety of different size food container openings) to have a circular shape and employ circular gaskets. A circular vacuum lid can even work on rectangular-shaped food storage containers provided the flexible elastomeric gasket affixed to the vacuum lid is sufficiently thick and compliant to compensate for vacuum-induced geometric distortions of the circular vacuum lid. Of course, the previously-mention indirect approach is always available wherein a rectangularly-shaped container is vacuum packed by placing it in a larger circular container.

The wide range of food container openings that exist makes it challenging to devise a space-efficient, cost-effective monolithic vacuum lid structure capable of mating with all food containers and have sufficient strength to resist vacuum-induced forces. A brute-force approach might be to employ a flat-bottom structure whose outside diameter was large enough to cover the opening of any food container of interest. However, the cost of covering the entire bottom of such a structure with a suitable elastomeric sealing material would make the structure prohibitively expensive. Further, such a large structure would be space-inefficient in that it would take up a disproportionate amount of space inside refrigerators when used on small or medium-size containers. Analytically, space efficiency is defined herein as the largest diameter of the vacuum structure minus the largest diameter of the food storage container, divided by the largest diameter of the food storage container. There is also the issue of strength. The atmospheric pressure of approximately 14.6 pounds per square exerts approximately 100 pounds on both sides of a 3-inch diameter Mason jar lid. The corresponding pressure on a lid covering a 10-inch pie pan would be approximately 1,100 pounds. Thus, the asymmetric forces on the lid of even a partially vacuumed container can be quite large. The uniformly distributed atmospheric loads exerted on the top of conventionally-designed vacuum lids can cause them to severely sag downward into the food container, and even fracture. Accordingly, a versatile vacuum lid structure must not only be adaptable to efficiently fit a variety of container openings, but also strong enough to effectively resist large vacuum-induced forces and deformations (sagging). An approach for minimizing sagging at the center of a vacuum lid structure is to employ methods that shift the area where atmospheric loads are resisted away from the center and outward toward the periphery of the vacuum lid structure, as described herein.

BRIEF SUMMARY OF THE INVENTION

A method and apparatus for reliably vacuum sealing a continuous range of food storage containers openings in a space-efficient and cost-effective manner by employing a modular assembly of overlapping flat-bottomed circular vacuum lids, all reinforced with circular ribs, and all having different inside and outside diameters. The innermost circular vacuum lid contains the check valve needed for evacuating air from food storage containers and fits the smallest size food storage containers. The innermost circular vacuum lid is stacked atop progressively larger circular vacuum lids to fit progressively larger food storage container openings

DETAILED DESCRIPTION OF THE INVENTION

Figure 1:
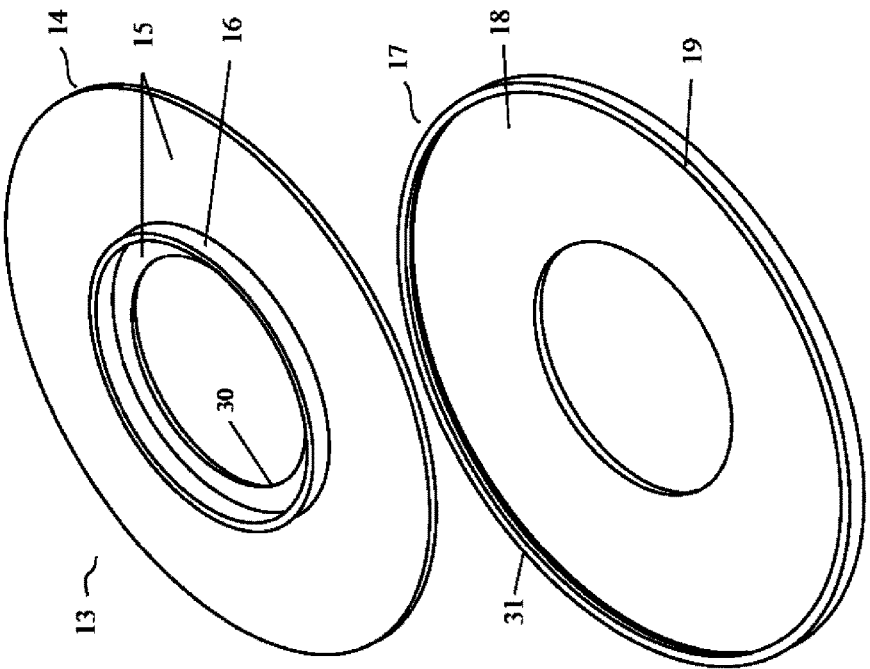
FIG. 1 shows a centermost circular vacuum lid consisting of a centermost firm disk, check valve, and flexible elastomeric material that covers the bottom of the centermost firm disk.

The present invention is a modular vacuum lid assembly (VLA) for vacuum sealing a continuous range of food storage container openings that consists of two or more overlapping circular vacuum lids wherein the outside diameter of each overlapping circular vacuum lid (or "lid" for brevity) overlaps the inside diameter of the next-size-larger lid. The term "continuous range of food storage container openings" means all food storage container openings of any size within a prescribed range. A VLA that covers a continuous range of openings differs from conventional practice wherein vacuum lids are commonly designed to fit discrete sizes of food storage container openings. The ability to vacuum seal a continuous range of openings allows users to vacuum seal any container that they already have (which is capable of holding a vacuum). A first circular vacuum lid is said to overlap a second circular vacuum lid when the outside diameter of the first circular vacuum lid is less than the outside diameter of the second circular vacuum lid, but greater than the inside diameter of the first circular vacuum lid. Each overlapping circular vacuum lid consists of a firm (i.e. stiff, but still flexible) disk, the bottom of which is covered by a flexible elastomeric gasket. The firm disk may be made of metal or a stiff, yet still flexible, plastic. The preferred stiff plastic is Polycarbonate because of its excellent strength and resilience, but other firm plastics may also be used, such as ABS and thermoset materials, for example.

The overlapping circular vacuum lid having the smallest outside diameter (i.e. the innermost circular vacuum lid) allows the VLA to efficiently mate with small-size food storage containers. The outside diameter of the innermost lid is large enough to cover the openings of Mason jars and other small-size jars, but small enough so that the lid does not extend obtrusively beyond the outside diameters of small-size food storage containers (wherein "small-size" is herein [6+] defined as food storage containers having outside diameters of 10 cm or less). The innermost lid is equipped with a check valve that allows air to exit the food storage container, but prevents air reentry until the user elects to do so.

Stacking the overlapping lids atop one another extends the outside diameter of the VLA to a size large enough to efficiently cover the opening of any food container of interest, wherein the objective is to minimize the amount that a VLA overhangs the outside diameter of the food storage container atop which it sits. The preferred embodiment of the present invention is a three-lid VLA comprised of overlapping circular vacuum lids (CVL) that efficiently covers the range of commonly-used bowls and food storage containers. More specifically, the preferred embodiment consists of overlapping innermost, intermediate, and outermost CVLs having outside diameters of approximately 10 cm, 18.8 cm, and 26 mm, respectively (approximately 4, 7.5, and 10.25 inches). For circular vacuum lids having the outside diameters stated above, the edges of the lids would overhang the outside diameters of mating food storage bowls by no more than 4.4 cm (1.7 inches) on a side, thereby enabling efficient use of space inside refrigerators.

To resist large vacuum-induced loads, the individual CVLs are reinforced by circular ribs that inhibit excessive deformations of each circular vacuum lid in the VLA when a vacuum is drawn on the food container atop which the VLA rests. The circular rib also causes the uniformly distributed atmospheric load exerted on the innermost overlapping circular lid to be transferred to the adjoining intermediate lid in the VLA stack as a circular line load, which minimizes the net downward deflection (sagging) at the geometric center of two overlapping CVLs. This benefit occurs for every pair of overlapping CVLs in the VLA. This approach makes every assembly of overlapping circular vacuum lids stiffer at its geometric center (where bending loads are greatest) than at its periphery (where bending loads are least). This approach moves the area where atmospheric loads are resisted away from the center and outward toward the periphery of the VLA, thereby minimizing central sagging. The same overall benefit could be achieved by a monolithic ribbed VLA, but such a fixed structure would be neither space-efficient nor cost-effective when used on food storage containers having outside diameters much less than that of the monolithic ribbed VLA.

The flexible elastomeric gasket covering the bottom side of each firm disk enables the firm disk to make air-tight seals with the top surfaces of other firm disks (which is the same as the top surfaces of other overlapping circular vacuum lids) or with the openings of food storage containers. Accordingly, the flexible elastomeric gasket must be soft enough to conform to minute irregularities around the edges of food storage containers openings, and resilient enough to not suffer permanent deformation when compressed by vacuum-induced forces. Gasket materials that are too stiff will allow air to seep through minute irregularities around the edges of food container openings. Permanent deformations also provide leakage paths. Silicone rubber is a material that exhibits good softness and resilience. More specifically, transparent, food-grade solid silicone rubber having a thickness of 1.5 mm and Shore Durometer A hardness between 50 and 55 provides a suitable combination of softness and resilience. A somewhat thicker (3.0 to 5.0 mm) closed-cell silicone foam material can be used for food containers whose openings have rough or irregular edges. Transparent materials are preferred over opaque ones because transparent materials they allow users to visually center the VLA over the opening of the food container, thereby yielding more uniform sealing pressure around the perimeter of the food container opening.

FIG. 1 shows an innermost CVL1 consisting of an innermost firm disk 2, check valve 3, and flexible elastomeric gasket 8 that covers the bottom of the innermost firm disk 2. The check valve 3 fits in the hole 4 in the center of said innermost firm disk 2 and extends through the bottom of the centermost innermost firm disk 2 and into the food storage container 12. The center most area 5 of the innermost firm disk 2 is elevated above the laterally-extending flange 7, which is the flat, extended portion of the firm disk 2, to prevent the bottom of the check valve 3 from contacting food in the storage container 12. A circular rib 6 stiffens the innermost firm disk 2 to minimize the amount that the innermost firm disk 2 deflects downward into the food storage container 12 when a vacuum is drawn on the CVL 1. FIG. 1 shows that the height of the circular rib 6 is several times the thickness of the laterally-extending flange 7, which is necessary for the rib 6 to significantly stiffen the laterally-extending flange 7. The flexible elastomeric gasket 8 attaches to the laterally-extending flange 7 of the centermost firm disk 2 by means of the collar 10 that wraps around the edge of the laterally-extending flange 7 to form a stretched, interference fit between the laterally-extending flange 7 and collar 10. FIG. 1. shows that the collar 10 possesses a circular groove that completely wraps around the top outside edge 32 and bottom outside edge 33 of firm disk 2 when the gasket 8 and centermost firm disk 2 are brought together. In other words, the flexible elastomeric gasket 8 attaches to the laterally-extending flange 7 of the centermost disk 2 by stretching the collar 10 around the edge of the laterally-extending flange 7, then releasing the collar 10 which will then hold the gasket 8 and disk 2 together. The collar 10 enables the flexible elastomeric gasket 8 to securely mount to its mating firm disk 2 without employing any other means. The outside diameter of the collar 10 constitutes the outside diameter 29 of the innermost CVL 1. The raised center area 9 of the flexible elastomeric gasket 8 conforms to the underside of the center most area 5 of the innermost firm disk 2.

FIG. 1 also shows an optional filter ring 11. The filter ring 11 secures paper filters (not shown) to the underside of the flexible elastomeric gasket 8. The filter paper may be of the type used to filter coffee grinds and is sandwiched between the underside of the flexible elastomeric gasket 8 and the filter ring 11. The filter ring 11 has tapered sides that allow it to form an interference fit with the center underside of the flexible elastomeric gasket 8, thereby securing the filter paper in place.

Figure 2:
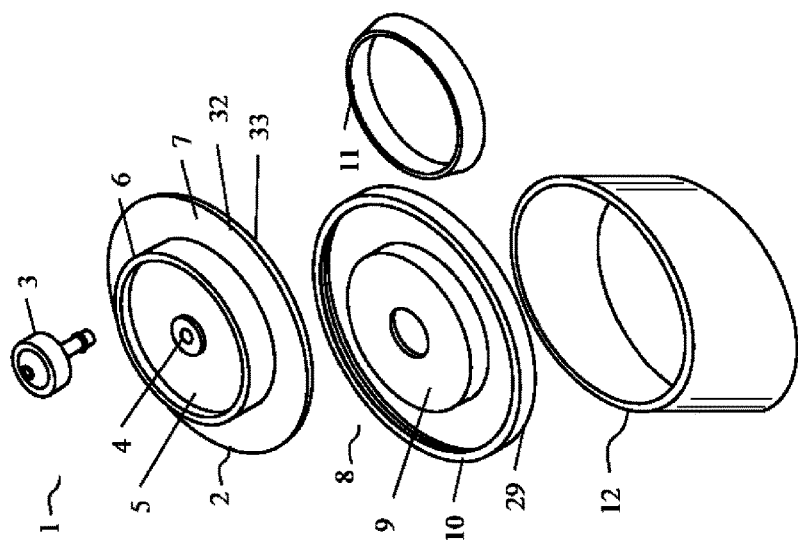
FIG. 2 shows an intermediate circular vacuum lid consisting of an intermediate firm disk and its mating flexible elastomeric material minimize.

FIG. 2 shows an intermediate CVL 13 consisting of an intermediate firm disk 14 and its mating flexible elastomeric gasket 17. The intermediate firm disk 14 has a top surface 15 and one circular rib 16 that stiffens the intermediate firm disk 14. The bottom surface (not labeled) of firm disk 14 is the surface opposite the top surface 15. The bottom surface (not labeled) of elastomeric gasket 17 is the surface opposite the top surface 18. The diameter of the circular inner edge 30 of the intermediate firm disk 14 constitutes the inside diameter of the intermediate firm disk 14, as well as the inside diameter of the CVL 13. The top surface 15 of the intermediate firm disk 14 and the bottom surface of the gasket 17 constitute the top and bottom surfaces, respectively, of the CVL 13. The diameter of the circular outer edge 31 of the intermediate flexible elastomeric gasket 17 constitutes the outside diameter of the intermediate flexible elastomeric gasket 17, as well as the outside diameter of the CVL 13. The disk 14 and gasket 17 in FIG. 2 are held together in the same way as the disk 2 and gasket 8 in FIG. 1. More specifically, the top surface 18 of the intermediate flexible elastomeric gasket 17 is drawn flush with the bottom surface of intermediate firm disk 14 when the collar 19 is stretched around the outside diameter of disk 14. The inside diameter of the circular rib 16 is slightly larger than the outside diameter of the collar 10 of the flexible elastomeric gasket 8 shown in FIG. 1, thereby allowing the innermost CVL 1 shown in FIG. 1 to nest atop the intermediate CVL 13 shown in FIG. 2. When nested together, the innermost CVL 1 and the intermediate CVL 13 form a two-component vacuum lid assembly (two-component VLA). A two-component VLA is suitable for medium-size bowls, where "medium-size" bowls are herein defined as bowls having outside diameters equal to or less than approximately 18.8 mm (7.5 inches).

Figure 3:
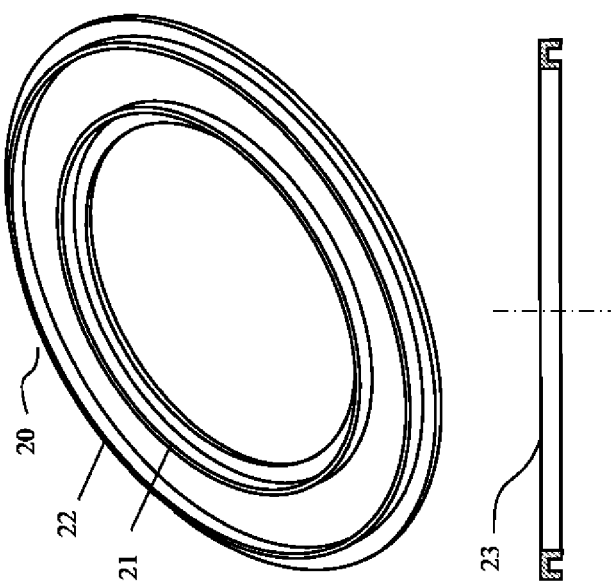
FIG. 3 shows an alternate embodiment of a medium-size firm disk, possessing two circular ribs, making it stiffer than a medium-size firm disk having only a single circular rib.

FIG. 3 shows an alternate embodiment of an intermediate firm disk 20, possessing an inner circular ribs 21 and outer circular rib 22, making it stiffer than the intermediate firm disk 13 depicted in FIG. 2. This embodiment of an intermediate firm disk 20 may be either the outermost component of a two-component VLA, or the intermediate component of a three-component VLA. The geometric center of a three-component VLA will deflect downward more than that of a two-component VLA because of the higher vacuum-induced forces that act on a three-component VLA. Accordingly, it is desirable for the center of a three-component VLA to stand higher above the food storage container so as not to contact food in the food storage container when the food storage container is vacuum packed. The center of a three-component VLA can be raised by turning the alternate embodiment of the intermediate firm disk 20 upside down, and pressing a circular elastomeric boot 23 over its outer circular rib 22. Turning the intermediate firm disk 20 upside down would raises the surface that mates with the bottom of a innermost vacuum lid by the thickness of the height of the outer circular rib 22. The circular elastomer boot 23 enables the outer circular rib 22 to form an air-tight seal with the top surface of the mating outermost component of a three-component VLA.

Figure 4:
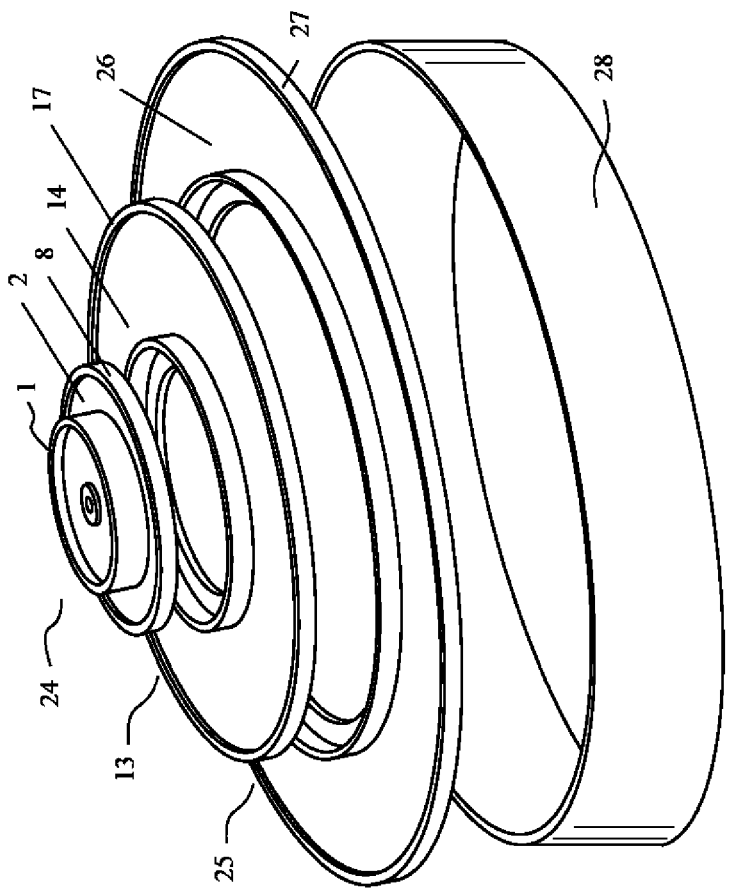
FIG. 4 is an exploded view of a three-component vacuum lid assembly positioned above a large food storage container.

FIG. 4 is an exploded view of a three-component VLA 24, positioned above a large food storage container 28. The three-component VLA consists of an innermost CVL 1, an intermediate CVL 13, and an outermost circular vacuum lid 25 stacked atop one another. The flexible elastomeric gaskets 8, 17, and 27 are attached to the innermost firm disk 2; intermediate firm disk 14, and outermost firm disk 26, respectively. The outside diameter of the largest gasket 27 constitutes the outside diameter of the VLA 24.

Figure 5:
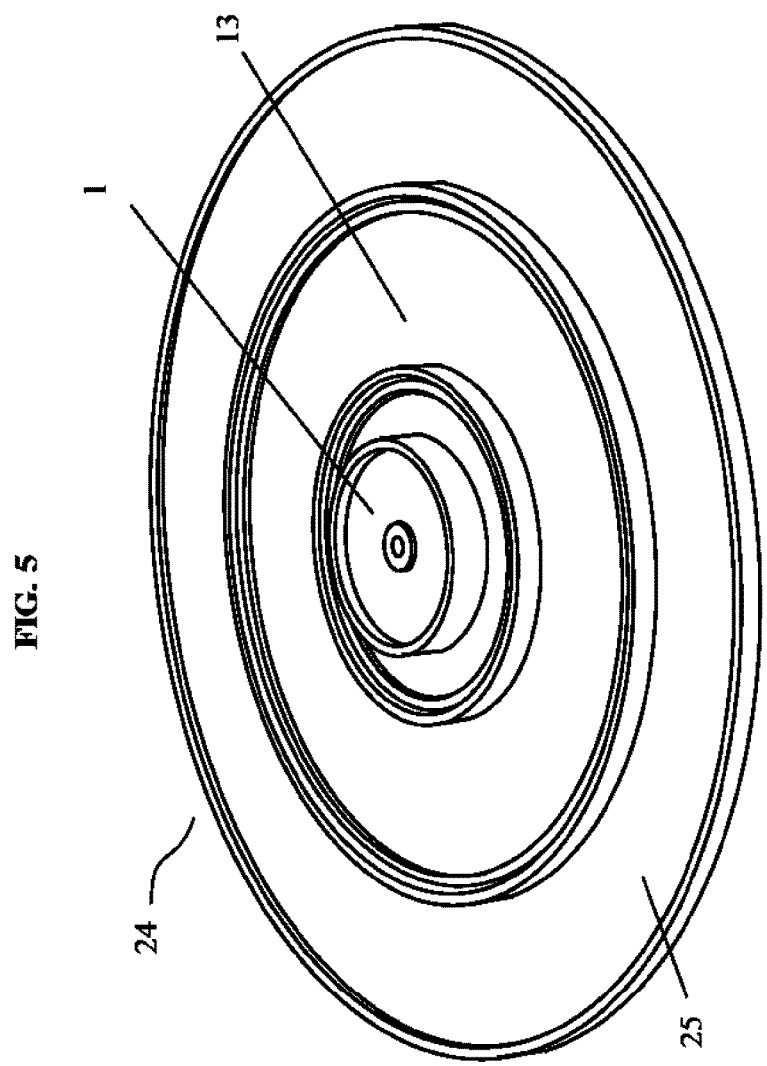
FIG. 5 shows the three-component vacuum lid assembly depicted in FIG. 4 collapsed down to the planer state it would have when placed atop a large food storage container

FIG. 5 shows the three-component VLA 24 depicted in FIG. 4 collapsed down to the nearly planer configuration it would have when placed atop a large food storage container.

Numerous modifications to and alternative embodiments of the present invention will be apparent to those skilled in the art in view of the foregoing description. Accordingly, this description is to be construed as illustrative only, and is for the purpose of teaching those skilled in the art the best modes of carrying out the invention. Details of the system may be varied substantially without departing from the spirit of the invention and the exclusive use of all modifications which come within the scope of the appended claims is reserved.

What I claim as my invention:

1. Apparatus for vacuum sealing a continuous range of food storage container openings, said apparatus being a vacuum lid assembly consisting of a plurality of at least two overlapping circular vacuum lids, the lids comprise an interior surface facing the inside of the container, an exterior surface opposite to the interior surface and a circular hole in its center, wherein each circular vacuum lid's inside diameter corresponds to the diameter of its hole, and the circular vacuum lid's outside diameter corresponds to the diameter of the outermost edge of the circular vacuum lid, and wherein the inside and outside diameters of each overlapping circular vacuum lid in the vacuum lid assembly and the circular holes are concentric, and wherein the inside and outside diameters of each overlapping circular vacuum lid are different than the inside and outside diameters of other overlapping circular vacuum lids in the vacuum lid assembly, and wherein each overlapping circular vacuum lid consists of a flat-bottom firm disk possessing a laterally-extending flange, and wherein each overlapping circular vacuum lid possesses a cylindrical rib on the exterior surface, the rib being of a substantially constant thickness and having an internal side facing towards the center of the lid and an external side facing the opposite side, the two sides are perpendicular to its laterally-extending flange, and wherein the entire bottom of the flat-bottom firm disk is releasably covered with a flexible elastomeric gasket that wraps around the outside edge of the flange by means of a circular collar to form an interference fit between the flange and the collar, wherein each said flexible elastomeric gasket creates an air-tight seal with either the open mouth of a food storage container or the top surface of a mating overlapping circular vacuum lid, wherein at least two of the overlapping circular vacuum lids are stacked atop one another so that the flexible elastomeric gasket of the overlapping circular lid having the smaller outside diameter rests atop the top surface of the overlapping circular vacuum lid having the larger outside diameter so an outer edge of the collar of the flexible elastomeric gasket of the overlapping circular lid having the smaller outside diameter rests against the internal side of the rib of the overlapping circular lid having the larger outside diameter forming an air-tight seal between the first and second circular vacuum lids, wherein the circular vacuum lid having the smallest outside diameter corresponds to the innermost circular vacuum lid, and wherein a check valve is fitted inside the hole of the innermost circular vacuum lid, and wherein the innermost circular vacuum lid has a circular central section that is raised above its laterally-extending flange.

2. A method for vacuum sealing a continuous range of food storage container openings consisting of providing an apparatus for vacuum sealing a continuous range of food storage container openings as disclosed on claim 1, placing the first of the plurality of at least two flat-bottom circular vacuum lids, over the opening of the food storage container, and then placing a second flat-bottom circular vacuum lid, of a smaller outside diameter than the first flat-bottom circular vacuum lid, over the hole in the first flat-bottom circular vacuum lid so that the outside diameter of the second circular vacuum lid fully overlaps the hole in the center of the first circular vacuum lid to form an air-tight seal between the first and second circular vacuum lids, and then placing successively smaller circular vacuum lids atop the existing assembly of circular vacuum lids until the entire opening of the food storage container is covered, and wherein a check valve is fitted in the hole of the topmost circular vacuum lid in the assembly, and then evacuating air from the food storage container through the said check valve.

* * * * *